United States Patent [19]

Palmieri et al.

[11] 4,194,287
[45] Mar. 25, 1980

[54] NYLON LINE VEGETATION CUTTER FEED

[76] Inventors: Vincent A. Palmieri; John P. Palmieri, both of 3745 El Camino Dr., San Bernardino, Calif. 92410

[21] Appl. No.: 16,563

[22] Filed: Mar. 1, 1979

Related U.S. Application Data

[63] Continuation-in-part of Ser. No. 925,045, Jul. 17, 1978.

[51] Int. Cl.$^2$ .............................................. A01G 3/06
[52] U.S. Cl. ........................................ 30/276; 56/12.7
[58] Field of Search .................... 30/276, 347; 51/335; 56/12.7

[56] References Cited

U.S. PATENT DOCUMENTS

| | | | |
|---|---|---|---|
| 2,452,409 | 10/1948 | Wickman | 51/335 |
| 2,522,920 | 9/1950 | Baltes | 51/335 |
| 4,086,700 | 5/1978 | Inada | 30/347 |
| 4,145,809 | 3/1979 | Proulx | 30/276 |
| 4,148,141 | 4/1979 | Hoff | 56/12.7 X |

*Primary Examiner*—Jimmy C. Peters
*Attorney, Agent, or Firm*—Dana E. Keech

[57] ABSTRACT

A line supply spool rotatably confined co-axially within a thin housing shell having a splined mounting on a polygonal arbor through which said housing shell is supported at the lower end of a manually supported engine powered handle while the shell is being spun at a high speed on a vertical axis, free line ends being progressively fed peripherally from the spool through equally spaced windows provided in the housing shell by controlled rotation of the spool relative to the housing shell.

The housing shell comprises two like die cast halves which abut each other in a medial radial plane with which the line feeding windows are symmetrically related. Each window is formed by two matching notches including four cups enclosing opposite ends of two tubular closely parallel line guiding rollers. Cast integrally with the four cups are four co-axial stub shafts on which the hollow rollers are centered internally.

O-ring means retain the rollers interlocked with the integral stub shafts on a selected one of the housing shell halves thereby making upwardly extending halves of the rollers available, when assembling the housing shell and spool, to receive and guide the line ends peripherally aligned with and extending radially through the shell housing windows.

6 Claims, 5 Drawing Figures

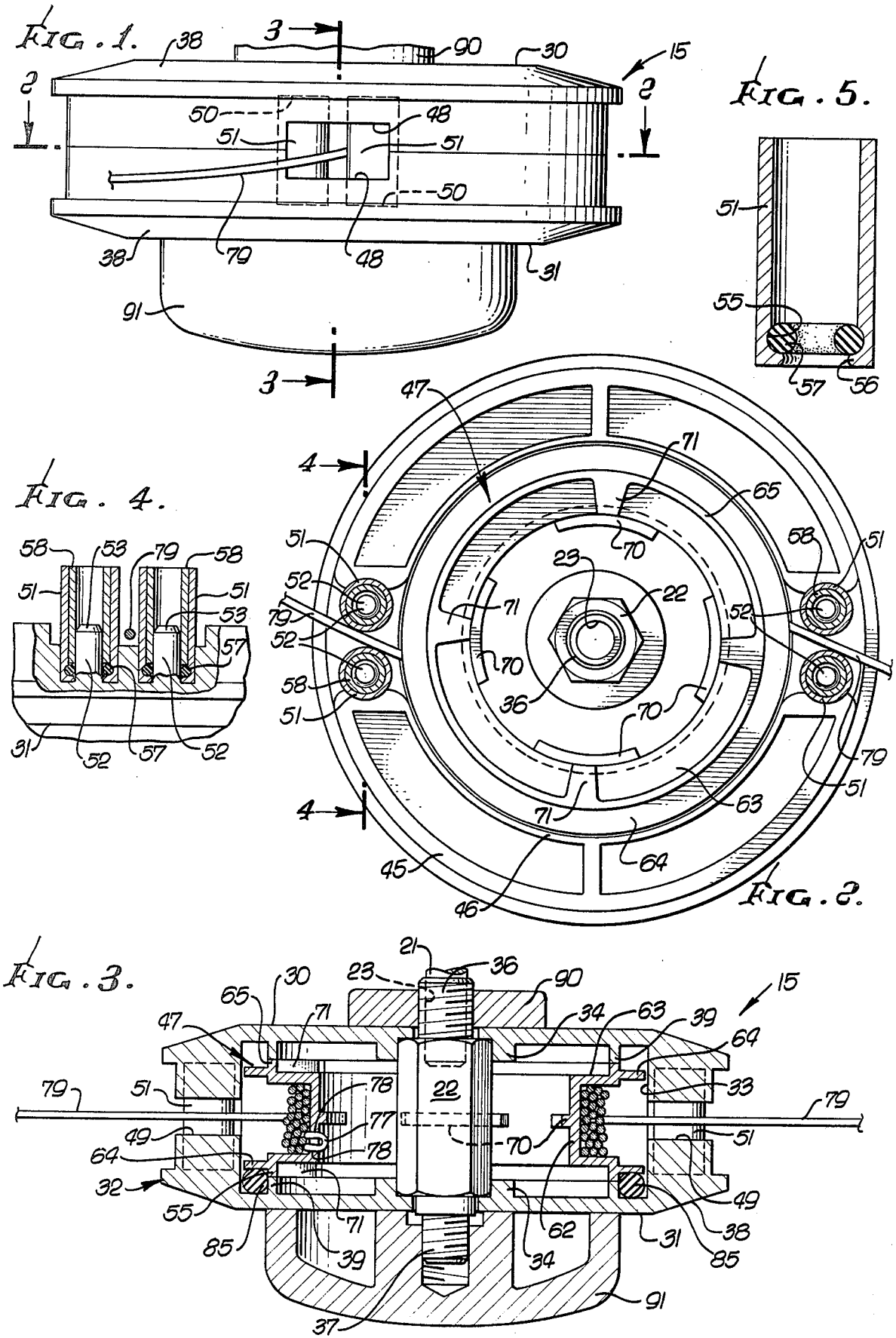

NYLON LINE VEGETATION CUTTER FEED

SUMMARY OF THE INVENTION

This application is a continuation in part of applicants' co-pending application Ser. No. 925,045 filed July 17, 1978 on ROTARY NYLON LINE VEGETATION CUTTER.

The present invention embraces the objects of:
1. Providing an improved mounting in the housing shell of such a vegetation cutter for pairs of rollers employed to guide the nylon line ends fed outwardly from the supply spool through the windows.
2. Providing hidden roller retaining means which assure that when the two halves of the housing are separated in order to replace an empty line supply spool with a fully loaded spool, the four tubular line guiding rollers will remain deeply associated with the bottom housing half whereby the entire upper halves of all four rollers will extend above the medial plane of the bottom housing half and thus be available to retain the free cutting lines withdrawn from the spool in proper radial extension from the lower housing half while the upper housing half is being axially applied in matching relation thereto.

BRIEF DESCRIPTION OF THE DRAWINGS

FIG. 1 is a full scale side edge elevational view of a preferred embodiment of the present invention which comprises a whirling nylon line vegetation cutting head and shows said head snugly assembled for operation.

FIG. 2 is a plan view of said cutting head taken on line 2—2 of FIG. 1 as said head appears when the upper housing half thereof has been temporarily removed to facilitate replacement of an empty cutting line supply spool by a full spool.

FIG. 3 is a vertical sectional view of the invention taken on the line 3—3 of FIG. 1 also snugly assembled for spinning the same for cutting vegetation.

FIG. 4 is a fragmentary vertical sectional detail view taken on the line 4—4 of FIG. 2 and illustrating how the pair of cutting line guiding rollers bordering each peripherally diametral cutting line feeding window are O-ring anchored to half-length stub shafts co-axially integrally molded in a selected one of the two half-housing shells thus forming effective readily accessible guides for delivering the cutting lines from the new spool into the peripheral line emitting windows of the housing.

FIG. 5 is an enlarged vertical axial sectional view of one of said tubular cutting line guide rollers equipped with an internal annular recess near its bottom end in which recess a small diameter O-ring is trapped for locking said roller against inadvertent displacement from a co-axial stub shaft integrally formed on the lower of two housing halves.

DETAILED DESCRIPTION OF THE PREFERRED EMBODIMENT

As shown in our co-pending application (supra) the rotary vegetation cutting head 15 of the present invention is designed to be manually supported on the lower end of a handle equipped with an engine and rapidly rotated while so suspended to flail vegetation in its path thereby trimming the same.

Referring to FIGS. 1, 2 and 3, the drive head 15 is seen to be suspended on a vertical threaded driving screw 21 which the upper end of a hexagonal arbor 22 of the head 15 has a tapped hole 23 to receive. Head 15 also includes upper and lower housing halves 30 and 31 which are identical so as to be united by arbor 22 to form a rotary cutter head housing 32 enclosing a flat cylindrical chamber 33 and presenting hex apertured shallow hubs 34 to the main hex body of arbor 22. Upper and lower extremities of arbor 22 are turned down to penetrate the central apertures of housing halves 30 and 31 as shown and provided with external threads 36 and 37.

The housing 32 has upper and lower peripherally tapered horizontal outside walls 38 inwardly from which are molded annular spool bearing tracks 39.

The inside diameter of the housing chamber 33 is formed by the inner of two concentric peripheral walls, outer wall 45 and inner wall 46, and the latter just provides adequate room for free rotation within chamber 33 of a vegetation cutting line magazine spool 47.

The outer and inner peripheral walls 45 and 46 of upper and lower housing halves abut face-to-face in the housing medial plane and certain diametrically opposed portions of said halves are partially filled in solid and provided with like opposed inner edge notches 48 which match to form two line escape windows 49. Vertically aligned closely spaced one-half inch diameter roller bearing receptacle cups 50 are molded in the partly filled in portions of walls 45 and 46 to rotatably trap pairs of tubular rollers 51 which are spaced apart about one-eighth inch and located symmetrically with the longitudinally diametral axial plane of line escape windows 49.

Molded integrally with housing halves 30 and 31 co-axially co-extensive with and partially occupying bearing receptacle cups 50 are roller trapping one-quarter inch diameter stub shafts 52, the upper ends of which are bevelled at 53 for a reason to be later pointed out.

The wall of each tubular roller 51 is one-sixteenth inch thick and the roller is one inch in length. As shown enlarged in FIG. 5 for better disclosing its detail structure, the lower end of each roller 51 has an annular internal recess 55 which is under scored by an annular internal lip 56, the internal diameter of which is less than that of the bore of the balance of the tube forming the roller 51.

Following the insertion of each tubular roller 51 into the lower of the two receptacle cups 50 by which that roller is captured in the finally assembled cutter head 15, an O-ring 57 is propelled downwardly into the upper end of that roller 51 by an O-ring assembling sleeve 58 until, as shown in FIG. 4, O-ring 57 is finally lodged in internal annular recess 55 with sleeve 58 flush at its upper end with the tubular roller 51 just installed. Thus the sleeve 58 forms a bearing between said tubular roller 51 and the two stub shafts 52 which extend co-axially into said sleeve 58 from the two housing halves 30 and 31 when these are fitted together after the tubular rollers 51 have been installed in one of these housing halves as above described and as shown in FIG. 4.

The bevelling of the tips of stub shafts 52 facilitates these shafts penetrating an O-ring 57 when it is pressed down inside the tubular roller 51 against the bevelled tip 53 of the lower stub shaft 52 occupying the lower half of said roller 51. Delivery of said O-ring as illustrated in FIG. 4 into its finally assembled relation with a tubular roller 51 is thus greatly expedited.

Plastics material is preferred in making housing halves 30 and 31 as well as the spool 47.

The latter element, as can be seen in FIGS. 2 and 3, is molded so as to be symmetrical about the medial plane at which the housing halves 30 and 31 abut. It is of course also freely rotatable co-axially with respect to the housing 32 within the limits imposed by the controls provided by the invention and described herein.

Being symmetrical about its interfacial plane, spool 47 will function just the same no matter which end is turned up in the assembly of the invention.

A similar facility in assembling and repairing the invention is served by the identity of the upper and lower housing halves 30 and 31.

The cutting line supply spool 47 has a thin walled cylindrical hub 62, the inside bore of which is about three times its axial length and has like outwardly peripherally beaded flat radial flanges 63 which are extended into close rotational relation with inner housing peripheral walls 46 by very thin radial peripheral spool flanges 64.

It is to be noted that the square cross sectional annular beads 65 on flanges 64 extend axially outwardly into matching bearing relation with housing spool positioning tracks 39.

For optionally employing spool 47 in a nylon line vegetation cutting head disclosed in said co-pending application for patent in which progressive rotation of said spool relative to the head is automatically accomplished, said spool has molded thereon to extend radially inwardly from the bore of cylindrical hub 62, symmetric with the medial horizontal plane of symmetry of spool 47, four square edged stops 70, each 50° in length, these stops being uniformly spaced apart 40° so as to be spaced apart 90° on centers. Filling in the space overlying and underlying the outwardly beaded radial peripheral spool flanges 63 and circumferentially oriented with the medial stops 70 in the bore of hub 62, are four upper and four lower radial stops 71.

Wound clockwise on the spool 47 before it is assembled within the rotary cutter head 15 is a doubled length of solid nylon line 76. The bight 77 at the inner turn of this doubled length of line is anchored to the spool by threading the two integral lengths of line simultaneously through a closely spaced pair of holes 78 provided at a convenient spot in the hub 62 of the spool. After the doubled line is then wound on the spool the respective end portions 79 of the line 76 are fed outwardly between the respective pairs of tubular rollers 51 lining the sides of the lower notches 48 of the line emitting windows 49 provided by the lower housing half 31 prior to application of the upper housing half 30 thereto in completing the assembly of the head.

Preliminary to such final assembly, however, an annular packing means, preferably an O-ring 85, must be inserted between spool 47 and one of the housing havles 30 and 31 as shown in FIG. 3. This O-ring 85 elastically overfills the annular free corner space between the lower spool flange 64 and housing half 31, whereby snugly compressing the housing halves together in finally assembling these, applies a braking action to spool 47 preventing its rotation relative to the head 15.

The final assembly is effected by tightly screwing nut 90 on the upper arbor threads 36 and a polyurethane bounce button 91 on lower arbor threads 37.

The head 15 is now in readiness to be screwed onto the driving screw 21 of the powered handle assembly and operated for trimming vegetation.

As the extending nylon cutting lines 79 become worn by such use, it is necessary to shut down the power means driving the rotary cutter head 15 while manually restoring the normal operating length to these lines. This is accomplished by partially unscrewing bounce button 91 so as to release spool 47 sufficiently from pressure from O-ring packing 85 to enable the manual withdrawal of lines 79 to restore their original length. This being accomplished and the bounce button 91 retightened, the cutting operation of the tool 15 may be at once resumed.

We claim:

1. In a flexible-line-whirling vegetation cutting hand tool, a rotary head for which is provided to be supported on and manipulated by a relatively long handle, the handle being equipped with power means for rapidly spinning said head on a vertical axis, the improvement comprising the following combination:
    a housing including a pair of complementary upper and lower housing portions united in an abutting relation in the radial vegetation cutting plane of the tool;
    matching opposed notches in meeting edges of said housing portions forming line emitting windows;
    matching, opposed, axially aligned roller capturing pairs of cups being formed in said housing portions circumferentially bordering said windows;
    means confined within said housing for delivering a supply of cutting line peripherally through said windows; and
    tubular rollers occupying said pairs of cups and captured thereby when said housing is assembled.

2. A combination as recited in claim 1, including
    pairs of stub shafts integrally molded with said housing portions in coaxial matching relation with each pair of said cups and thus co-axially supporting from within said roller, the tubular roller captured by said pair of cups.

3. A combination as recited in claim 2 including
    an internal annular recess provided in the bore of said tubular roller; and
    elastic annular retainer means captured in said recess and frictionally engaging one of said stub shafts to retain said roller in assembled relation with said shaft when said housing portions are separated to replace an empty cutting line spool with a full spool.

4. A combination as recited in claim 3 wherein
    said elastic roller retainer means comprises an O-ring acceptable when pressed within and along said tubular roller and expanding into said internal annular recess when pressed through said roller to the level of said recess; and
    an assembling sleeve slideably fitting the annular space between one of said stub shafts and one of said rollers, said sleeve serving to feed said O-ring into said annular roller recess and is then removeable, if desired, before said housing portions are assembled.

5. A combination as recited in claim 4 wherein
    said assembling sleeve also serves as a bearing sleeve and is of a length such as to terminate at its outer end flush with the adjacent end of said tubular roller.

6. A combination as recited in claim 5 wherein
    said annular internal recess is located near the lower end of said tubular roller; and
    an internal annular lip located just beneath said recess, the internal diameter of said lip being substantially less than the bore of said roller.

* * * * *